(No Model.)
J. H. HUNT.
AUTOMATIC VENTILATOR AND FOUL AIR EXHAUSTER.
No. 461,873. Patented Oct. 27, 1891.
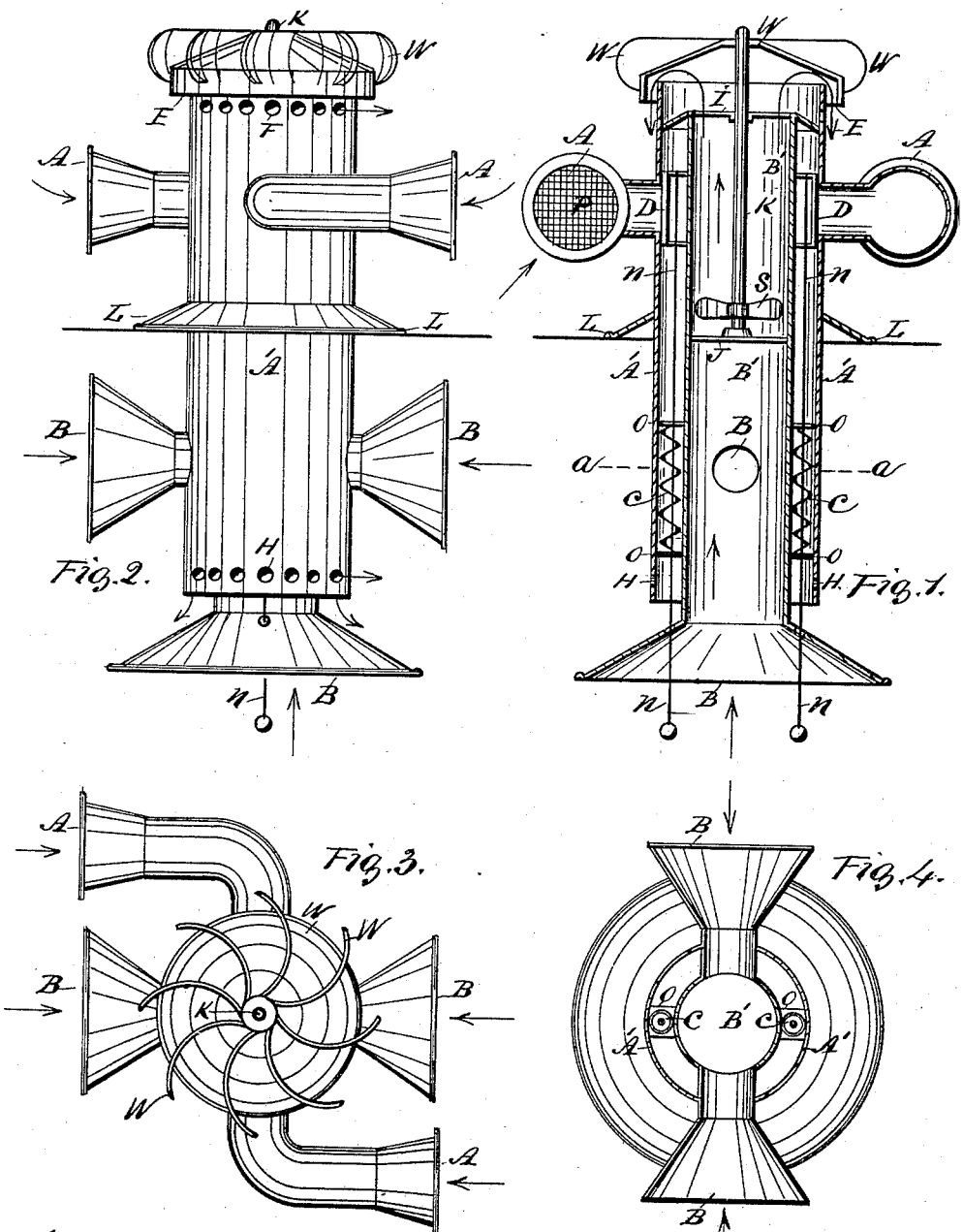

UNITED STATES PATENT OFFICE.

JOHN HENRY HUNT, OF HAMILTON, CANADA.

AUTOMATIC VENTILATOR AND FOUL-AIR EXHAUSTER.

SPECIFICATION forming part of Letters Patent No. 461,873, dated October 27, 1891.

Application filed August 7, 1890. Serial No. 361,402. (No model.) Patented in Canada July 2, 1890, No. 34,602.

*To all whom it may concern:*

Be it known that I, JOHN HENRY HUNT, a British subject, of the city of Hamilton, in the county of Wentworth, in the Province of Ontario, Canada, have invented certain new and useful Improvements in the Construction of an Automatic Ventilator and Foul-Air Exhauster, (for which I have obtained a patent in Canada, No. 34,602, bearing date July 2, 1890,) of which the following is a specification of the same, as shown in the accompanying drawings, in which—

Figure 1 is a vertical section showing screw-shaft and wheel; Fig. 2, a side elevation of ventilator embodying my invention. Fig. 3 is a plan of the same; Fig. 4, part plan A section at A A.

Letter D, Fig. 1, represents fresh-air valves; letter A, Fig. 1, passage for fresh air; letter B, Fig. 1, passage for foul air, dust, &c.; letter $a$, Fig. 1, section; letter C, Fig. 1, spiral spring; letter W, Fig. 1, power-wheels and driving-screw; letter S, Fig. 1, screw for exhausting foul air, dust, &c.; letter H, Fig. 2, holes for ventilation from air-passages; letter E, Fig. 1, foul-air exhaust.

The first part of my invention relates to the combination of the inner and outer cylinders in connection with the three foul-air exhausters, letters B B B, Fig. 2, and fresh-air passages, letters A A, Fig. 2, so constructed that the outer cylinder draws the fresh air down and the inner cylinder draws all the foul air, dampness, gases, &c., at the same time.

The second part of my invention relates to the combination of power-wheels and driving-screw, as shown at letters W and S, Fig. 1, the object of which is to draw away all foul air and gases that might exist in any building, steamboat, railway-cars, &c., and passing through foul-air exhaust, letter E, Fig. 1.

The third part of my invention relates to the combination of the right and left air-passages, as shown at letters A A, Fig. 2 and marked with broad arrow, together with the wire screens for preventing any foreign substance from entering the air-passages, letter A, Fig. 1; also, the spiral springs and slides, as shown at letters D and C, Fig. 1, which are used in connection with fresh-air passages A A to open and shut at will, the object of which is to supply the fresh air from any direction in which the wind may be blowing and which travels between the inner and outer cylinders and makes its exit through the holes at the bottom, (marked letter H, Figs. 2 and 4.) The outer cylinder A' is provided with a flange L, which supports the ventilator. The inlets above this flange line L admit fresh air and the inlets below this line admit foul air. The upright shaft K is supported at its upper end by a narrow brace I and the lower end is supported by a narrow brace J, both in the inner cylinder B'. The spiral springs C have each an incasement O, and the air-valves D are operated by the rods N, in connection with said springs. Both the valves are shown closed in the drawings, Fig. 1. Foul air is also exhausted through the holes F.

What I claim as my invention, and desire to secure by Letters Patent, is—

The combination of the outer cylinder A', having the flange L, and the fresh-air inlets A, the valves for said inlet, the inner cylinder B', having foul-air inlets B, upright shaft K, supported in cylinder B' and provided at its upper end with the power air-wheel W and at its lower end with the exhaust-fan S, the wheel W being provided with a depending rim, and the tube A' being perforated near its upper end, substantially as described and set forth.

Hamilton, July 28, 1890.

JOHN HENRY HUNT.

In presence of—
JOSEPH JOHNSON,
WILLIAM HOLMES.